US010324547B2

(12) United States Patent
Han et al.

(10) Patent No.: US 10,324,547 B2
(45) Date of Patent: Jun. 18, 2019

(54) ACTIVE STYLUS PEN, TOUCH SENSING SYSTEM AND DRIVING METHOD THEREOF

(71) Applicant: LG Display Co., Ltd., Seoul (KR)

(72) Inventors: Sungsu Han, Gyeonggi-do (KR); Hyunguk Jang, Gyeonggi-do (KR); Sungchul Kim, Gyeonggi-do (KR); Sanghyuck Bae, Gyeonggi-do (KR); Suyun Ju, Gangwon-do (KR); Doyoung Jung, Seoul (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 15/384,766

(22) Filed: Dec. 20, 2016

(65) Prior Publication Data

US 2017/0192534 A1 Jul. 6, 2017

(30) Foreign Application Priority Data

Dec. 31, 2015 (KR) ........................ 10-2015-0190945
Dec. 2, 2016 (KR) ........................ 10-2016-0163499

(51) Int. Cl.

*G06F 3/038* (2013.01)
*G06F 3/041* (2006.01)
*G06F 3/0354* (2013.01)
*G06F 3/044* (2006.01)

(52) U.S. Cl.

CPC ........ *G06F 3/0383* (2013.01); *G06F 3/03545* (2013.01); *G06F 3/044* (2013.01); *G06F 3/0416* (2013.01)

(58) Field of Classification Search

CPC .... G06F 3/0383; G06F 3/03545; G06F 3/038; G06F 3/041; G06F 3/0416; G06F 3/044; G06F 3/0354; G06F 2203/04111; G06F 2203/04112; G06F 3/04883; G06F 3/0317
See application file for complete search history.

(56) References Cited

U.S. PATENT DOCUMENTS

2012/0105362 A1 5/2012 Kremin et al.
2013/0207926 A1* 8/2013 Kremin ................ G06F 3/0383 345/174
2014/0168137 A1 6/2014 Pyo et al.
2014/0176495 A1* 6/2014 Vlasov ................ G06F 3/03545 345/174

(Continued)

FOREIGN PATENT DOCUMENTS

KR 10-2014-0043299 A 4/2014
KR 10-2014-0079689 A 6/2014

*Primary Examiner* — Md Saiful A Siddiqui
(74) *Attorney, Agent, or Firm* — Morgan, Lewis & Bockius LLP

(57) ABSTRACT

An active stylus pen according to the present invention includes a first signal processor configured to generate a touch frame recognition signal for discriminating touch frames on the basis of sub-pulses corresponding to part of each touchscreen driving signal received from a touchscreen and a second signal processor configured to generate a pen driving signal synchronized with main pulses of each touch-screen driving signal other than the sub-pulses and to vary the pen driving signal in units of a touch frame according to the touch frame recognition signal such that additional pen information is reflected in the pen driving signal.

27 Claims, 17 Drawing Sheets

(56) References Cited

U.S. PATENT DOCUMENTS

2015/0070293 A1* 3/2015 Yu .......................... G06F 3/044
345/174
2015/0193025 A1* 7/2015 Rebeschi ............ G06F 3/03545
345/174
2016/0306447 A1* 10/2016 Fleck .................. G06F 3/03545
2016/0306448 A1* 10/2016 Fleck .................. G06F 3/03545

* cited by examiner

FIG. 18

| transmission bit | Signal pattern |
|---|---|
| 0 | 1 0 0 1 1 0 1 0 0 1 0 1 0 1 0 1 1 0 0 1 1 0 0 1 1 0 1 0 |
| 1 | 1 0 1 0 0 1 0 1 1 0 1 0 0 1 0 1 0 1 0 1 1 0 0 1 1 0 0 1 |
| 2 | 1 0 1 0 1 0 0 1 0 1 1 0 0 1 0 1 1 0 1 0 0 1 0 1 0 1 0 1 |
| 3 | 1 0 0 1 0 1 1 0 0 1 0 1 1 0 1 0 0 1 0 1 0 1 0 1 1 0 0 1 |
| 4 | 1 0 0 1 0 1 1 0 0 1 1 0 0 1 1 0 1 0 1 0 1 0 0 1 0 1 1 0 |
| 5 | 1 0 1 0 0 1 1 0 0 1 1 0 1 0 1 0 1 0 0 1 0 1 1 0 0 1 0 1 |
| 6 | 1 0 1 0 1 0 1 0 1 0 0 1 0 1 1 0 0 1 0 1 1 0 1 0 0 1 0 1 |
| 7 | 1 0 1 0 0 1 1 0 1 0 1 0 1 0 0 1 0 1 1 0 0 1 0 1 1 0 1 0 |

ACTIVE STYLUS PEN, TOUCH SENSING SYSTEM AND DRIVING METHOD THEREOF

This application claims the benefit of Korea Patent Application Nos. 10-2015-0190945 and 10-2016-0163499 filed on Dec. 31, 2015 and Dec. 2, 2016, which are incorporated herein by reference for all purposes as if fully set forth herein.

BACKGROUND

Field of the Invention

The present invention relates to a touch sensing system, and more specifically, to a touch sensing system to which touch input can be applied through an active stylus pen and a driving method thereof.

Discussion of the Related Art

User interfaces (UIs) enable people (users) to easily control various electronic devices as desired. Typical examples of such UIs include a keypad, a keyboard, a mouse, an on-screen display (OSD), a remote controller having an infrared communication or radio frequency (RF) communication function, etc. User interface technology steadily develops to increase user emotion and operation convenience. Recent user interfaces have evolved into a touch UI, a speech recognition UI, a 3D UI and the like.

The touch UI is essentially adopted by portable information devices. The touch UI is implemented through a method of generating a touchscreen on a screen of a display device. The touchscreen may be a capacitive touchscreen. A touchscreen having a capacitive touch sensor detects touch input by sensing a capacitance variation according to input of a touchscreen driving signal, that is, a charge variation in a touch sensor, when a finger or a conductive material contacts (or approaches) the touch sensor.

The capacitive touch sensor may be configured as a self-capacitance sensor or a mutual capacitance sensor. Electrodes of the self-capacitance sensor can be connected one-to-one to sensor lines formed in one direction. The mutual capacitance sensor can be formed at an intersection of sensor lines intersecting each other having a dielectric layer interposed therebetween.

Recently, a stylus pen as well as a finger have been widely used as a human interface device (HID) for smartphones, tablets and the like. The stylus pen has the advantage of more precise input than a finger. There are passive and active stylus pens. The passive stylus pen has difficulty detecting a touch point because capacitance slightly varies at a touch point on a touchscreen. The active stylus pen generates a pen driving signal and outputs the pen driving signal to a touch point on a touchscreen and thus easily detects a touch point compared to the passive stylus pen.

Recent active stylus pens have been designed to transmit various additional pen information, such as pen pressure information, button state information and pen ID information, as well as the pen driving signal. However, a conventional active stylus pen further requires an additional communication block for transmitting additional pen information to a touch module, as disclosed in Korean Patent No. 10-2014-0043299, increasing manufacturing costs. Furthermore, the conventional active stylus pen has large transmission load because a pen driving signal and additional pen information are individually transmitted. To solve this problem, a method of loading the additional pen information on the pen driving signal and the pen driving signal including the additional pen information on the basis of touch frames may be considered. To this end, the active stylus pen needs to discriminate touch frames but methods therefor have not yet been developed.

SUMMARY

Accordingly, the present invention is directed to an active stylus pen, a touch sensing system, and a driving method thereof that substantially obviate one or more of the problems due to limitations and disadvantages of the related art.

An object of the present invention is to provide an active stylus pen and a touch sensing system including the same, which can easily discriminate touch frames through the active stylus pen and reflect additional pen information in a pen driving signal in units of a touch frame and a driving method thereof.

Another object of the present invention is to provide an active stylus pen, a touch sensing system including the same and a driving method thereof, which can improve accuracy of synchronization between the active stylus pen and a touchscreen.

Additional features and advantages of the invention will be set forth in the description that follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an active stylus pen comprises a first signal processor configured to generate a touch frame recognition signal for discriminating touch frames on the basis of sub-pulses corresponding to part of each touchscreen driving signal received from a touchscreen; and a second signal processor configured to generate a pen driving signal synchronized with main pulses of each touchscreen driving signal other than the sub-pulses and to vary the pen driving signal in units of a touch frame according to the touch frame recognition signal such that additional pen information is reflected in the pen driving signal.

The first signal processor may count an interval between a first sub-pulse of a touchscreen driving signal and a second sub-pulse of another touchscreen driving signal neighboring the touchscreen driving signal to generate a first count value and generate the touch frame recognition signal when the first count value exceeds a predetermined threshold value.

The first signal processor may count the sub-pulses included in each touchscreen driving signal to generate a second count value and generate the touch frame recognition signal when the second count value satisfies a predetermined value.

The second signal processor may vary a pulse amplitude of the pen driving signal in units of a touch frame according to the touch frame recognition signal such that the additional pen information is reflected in the pen driving signal.

The second signal processor may vary a pulse duty of the pen driving signal in units of a touch frame according to the touch frame recognition signal such that the additional pen information is reflected in the pen driving signal.

The second signal processor may allocate 1 bit of the pen driving signal in which the additional pen information has been reflected per touch frame.

The additional pen information may include pen pressure information indicating pressure when the active stylus pen touches the touchscreen, button state information indicating whether at least one function button included in the active stylus pen and executing a specific function is activated, and pen identification information for discriminating the active stylus pen from other active stylus pens.

In another aspect, a touch sensing system comprises a touchscreen; a touch driver configured to apply a touchscreen driving signal to the touchscreen and to sense a capacitance variation in the touchscreen; and an active stylus pen configured to generate a pen driving signal and to transmit the pen driving signal to the touchscreen, wherein the active stylus pen comprises: a first signal processor configured to generate a touch frame recognition signal for discriminating touch frames on the basis of sub-pulses corresponding to part of each touchscreen driving signal received from the touchscreen; and a second signal processor configured to generate the pen driving signal synchronized with main pulses of each touchscreen driving signal other than the sub-pulses and to vary the pen driving signal in units of a touch frame according to the touch frame recognition signal such that additional pen information is reflected in the pen driving signal.

In another aspect, a method of driving a touch sensing system comprises bringing an active stylus pen into contact with a touchscreen to receive a touchscreen driving signal by the active stylus pen; the active stylus pen generating a pen driving signal synchronized with the received touchscreen driving signal and outputting the pen driving signal to the touchscreen; and a touch driver connected to the touchscreen sensing a capacitance variation in the touchscreen according to the touchscreen driving signal and the pen driving signal, wherein the active stylus pen generating the pen driving signal and outputting the pen driving signal to the touchscreen comprises: generating a touch frame recognition signal for discriminating touch frames on the basis of sub-pulses corresponding to part of each touchscreen driving signal received from the touchscreen; and generating the pen driving signal synchronized with main pulses of each touchscreen driving signal other than the sub-pulses and varying the pen driving signal in units of a touch frame according to the touch frame recognition signal such that additional pen information is reflected in the pen driving signal.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

Figure 14:
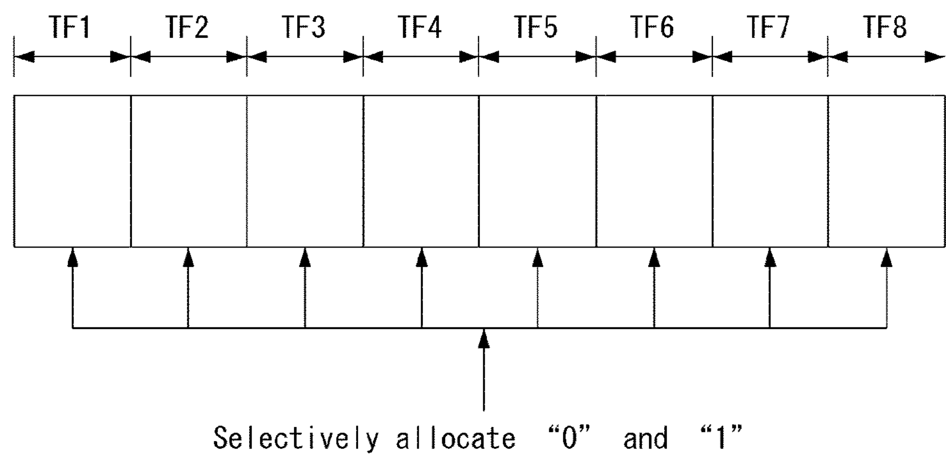
Figure 15:
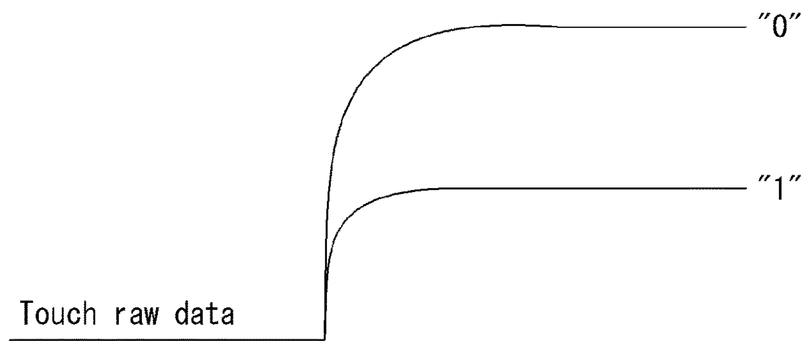

FIGS. **12*a* and 12*b*** illustrate a method of discriminating touch frames through the active stylus pen and various modulation forms of a pen driving signal for representing additional pen information;

FIGS. **13*a* and 13*b*** illustrate another method of discriminating touch frames through the active stylus pen and various modulation forms of a pen driving signal for representing additional pen information;

FIG. 14 illustrates a method of generating additional pen information using a plurality of touch frames in the active stylus pen; and FIG. 15 illustrates a variation of touch row data sensed by a touch driver according to additional pen information.

Figure 16:
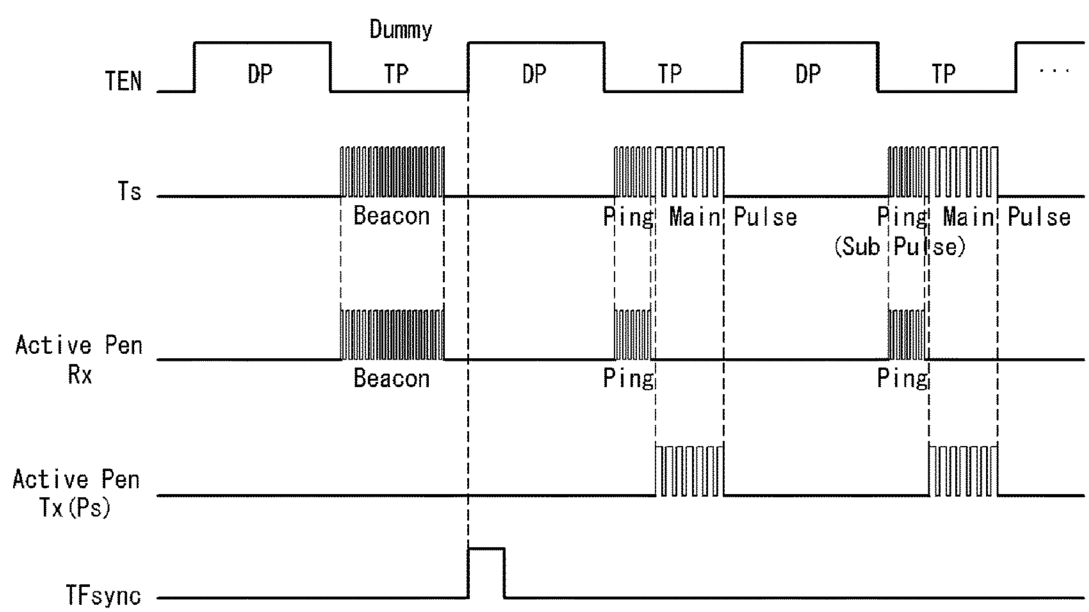
Figure 17:
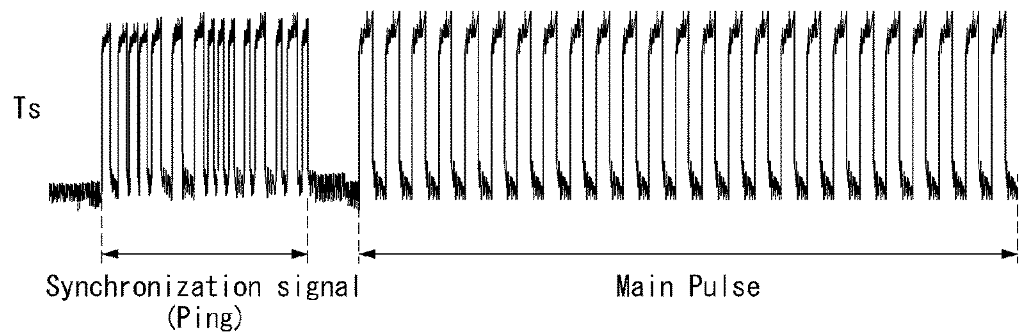

FIGS. 16 and 17 illustrate a method for improving accuracy of synchronization between an active stylus pen and a touchscreen.

FIG. 18 illustrates an example of bit allocation according to synchronization signal patterns.

DETAILED DESCRIPTION

Reference will now be made in detail to embodiments of the invention, examples of which are illustrated in the accompanying drawings. Wherever possible, the same reference numbers will be used throughout the drawings to refer to the same or like parts. Detailed description of the known art will be omitted if it is determined that such description might obscure the embodiments of the invention.

[Touch Sensing System]

Figure 1:
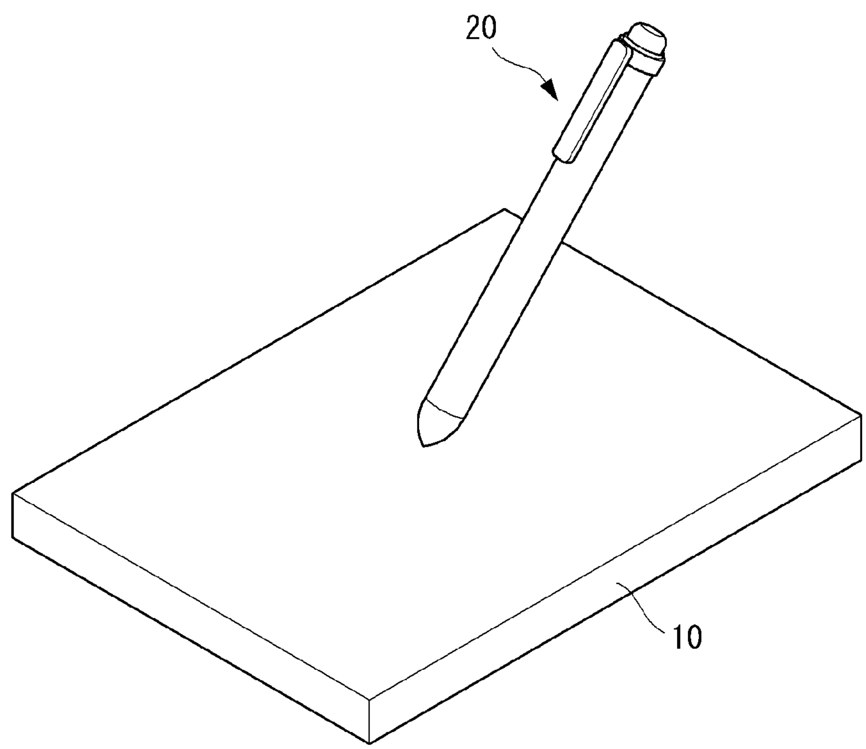
FIG. 1 schematically illustrates a touch sensing system of the present invention.

FIG. 1 schematically illustrates a touch sensing system of the present invention.

Referring to FIG. 1, the touch sensing system of the present invention includes a display device 10 and an active stylus pen 20.

The display device 10 executes a display function and a touch sensing function. The display device 10 can detect touch by a conductive object such as a finger or the active stylus pen 20 and includes an integrated capacitive touchscreen. Here, the touchscreen may be configured independently of a display panel for realizing a display or embedded in a pixel array of the display panel. The configuration and operation of the display device 10 will be described in detail below with reference to FIGS. 2 to 9.

The active stylus pen 20 generates a pen driving signal on the basis of a touchscreen driving signal received from the touchscreen and outputs the pen driving signal to a touch point on the touchscreen to facilitate touch point detection on the touchscreen. The active stylus pen 20 generates a touch frame recognition signal on the basis of sub-pulses corresponding to part of a touchscreen driving signal and varies a pen driving signal in units of a touch frame according to the touch frame recognition signal such that predetermined additional pen information is reflected in the pen driving signal. The touch sensing system senses a touch input point by the active stylus pen 20 and additional touch information by analyzing touch row data according to the pen driving signal. The additional pen information may include pen pressure information indicating pressure when the active stylus pen touches the touchscreen, button state information indicating whether at least one function button included in the active stylus pen and executing a specific function is activated, pen identification information for discriminating the active stylus pen from other active stylus pens, etc.

The configuration and operation of the active stylus pen 20 will be described below with reference to FIGS. 10 to 15.

[Display Device]

Figure 2:
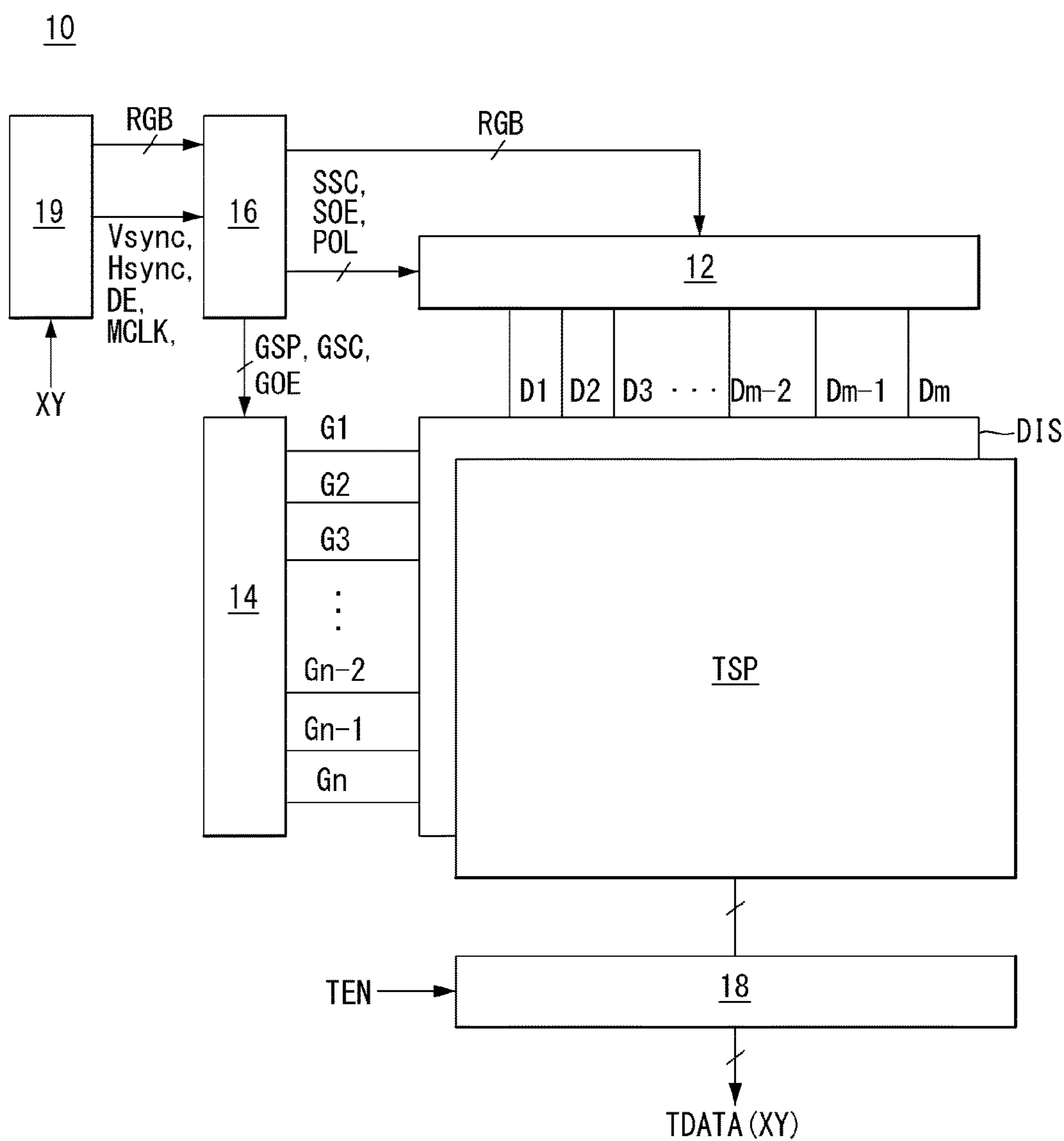
FIG. 2 illustrates a display device applied to the touch sensing system according to an embodiment of the present invention.
Figure 3:
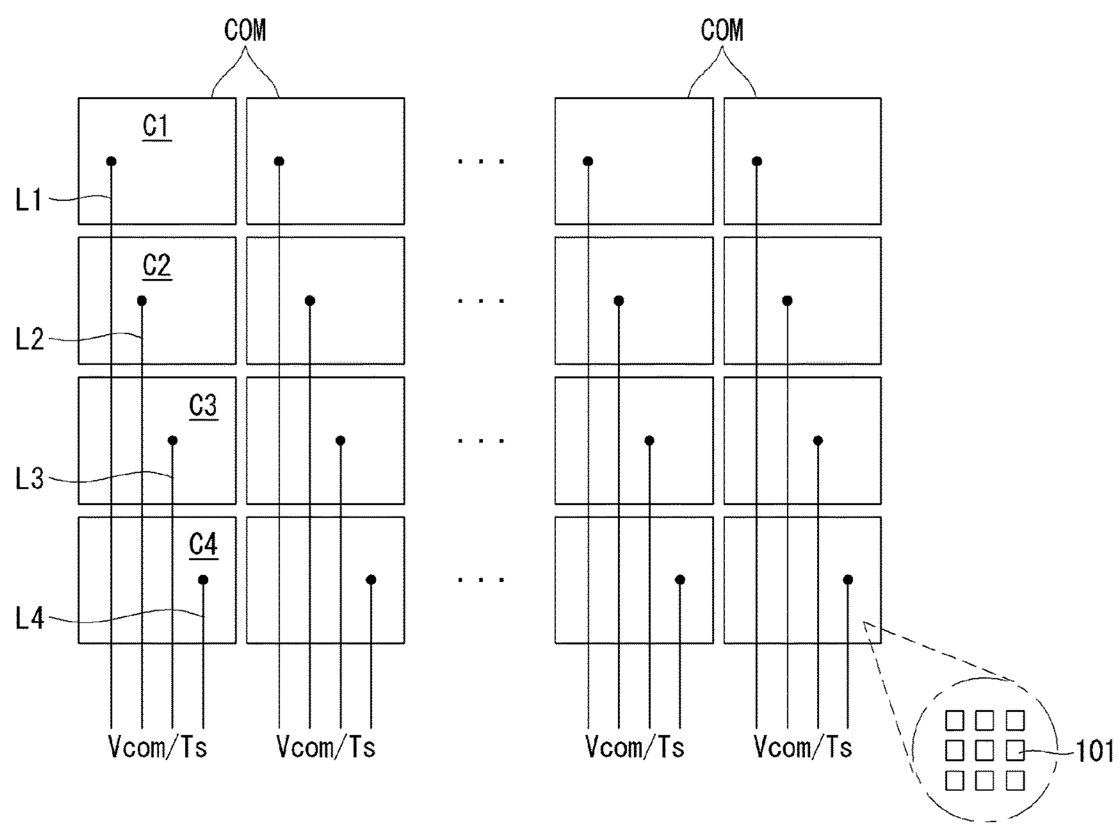
FIG. 3 illustrates an example of touch sensors included in a pixel array.
Figure 4:
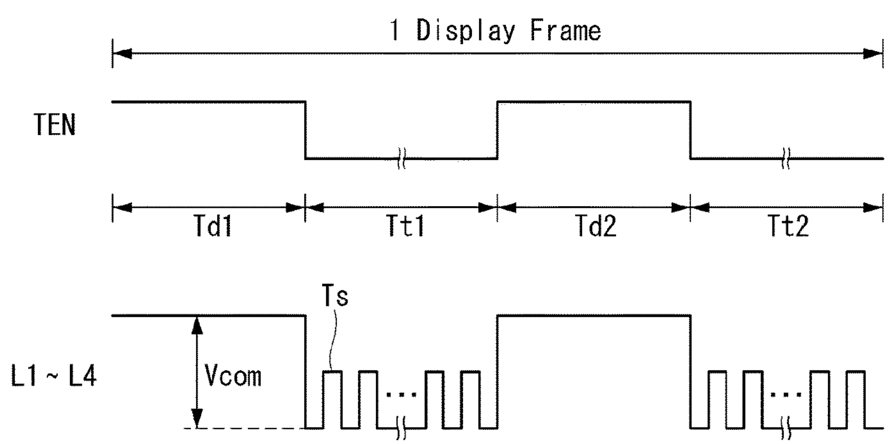
FIG. 4 is a timing diagram illustrating a method of time-division-driving pixels and touch sensors of a display panel shown in FIG. 3.
Figure 5:
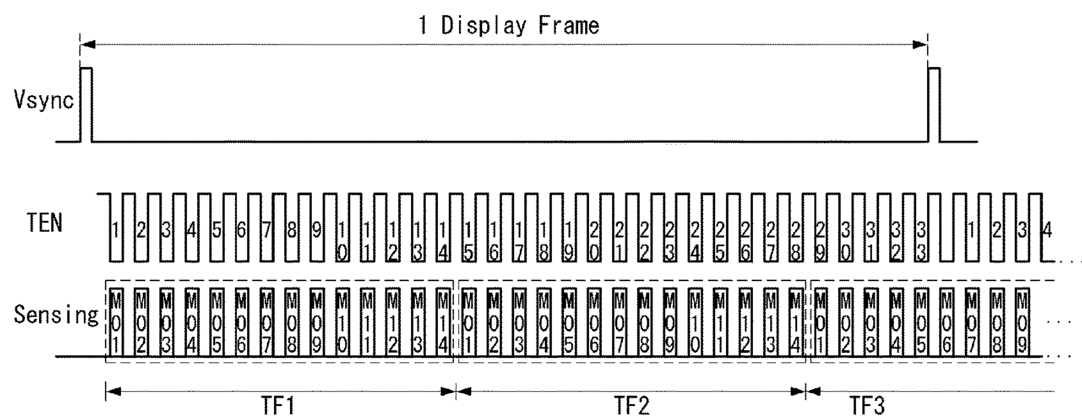
FIG. 5 illustrates an example in which a plurality of touch frames is included in one display frame period.
Figure 6:
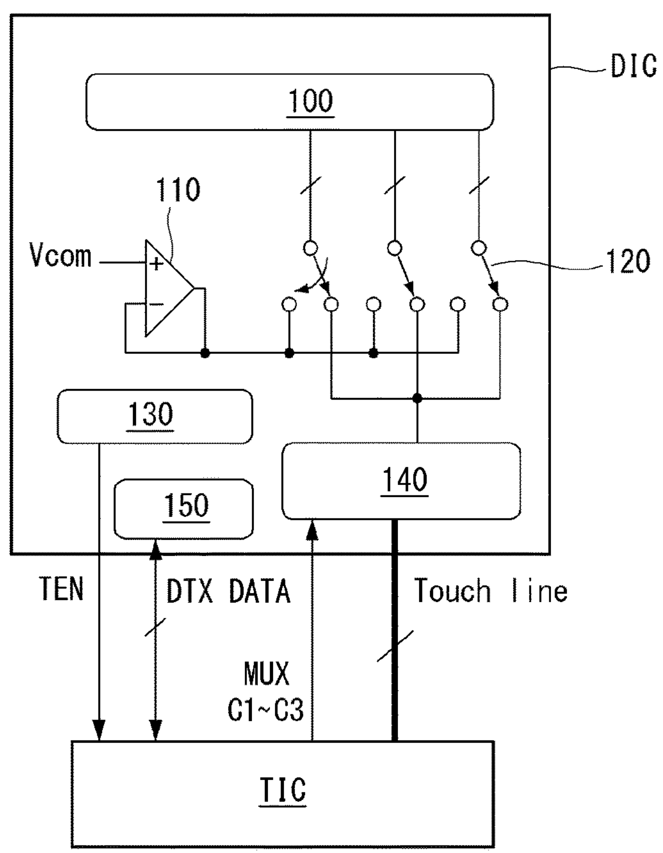
FIGS. 6 to 8 illustrate touch drivers according to embodiments of the present invention.
Figure 7:
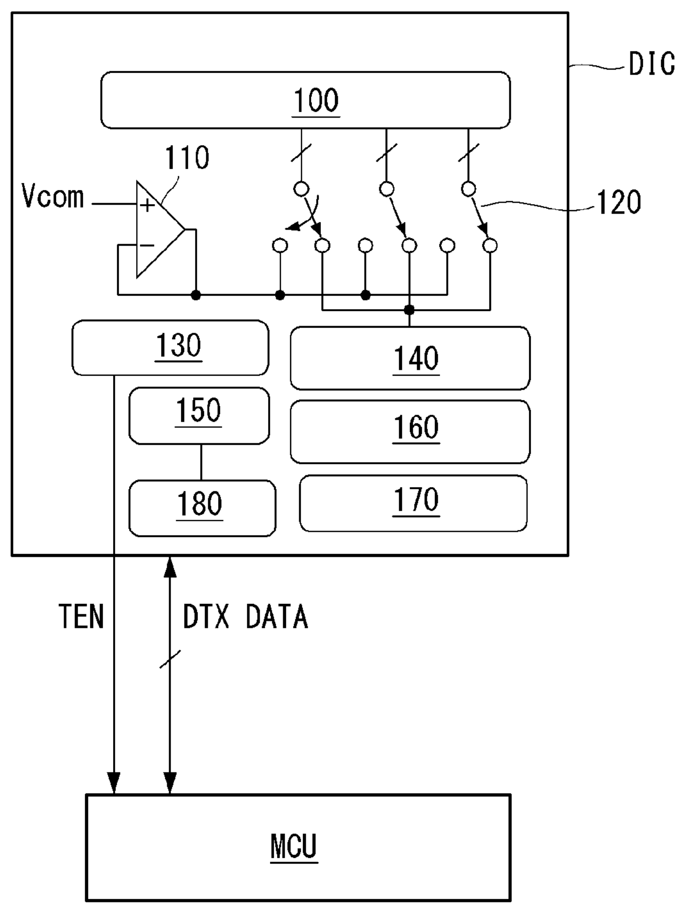
Figure 8:
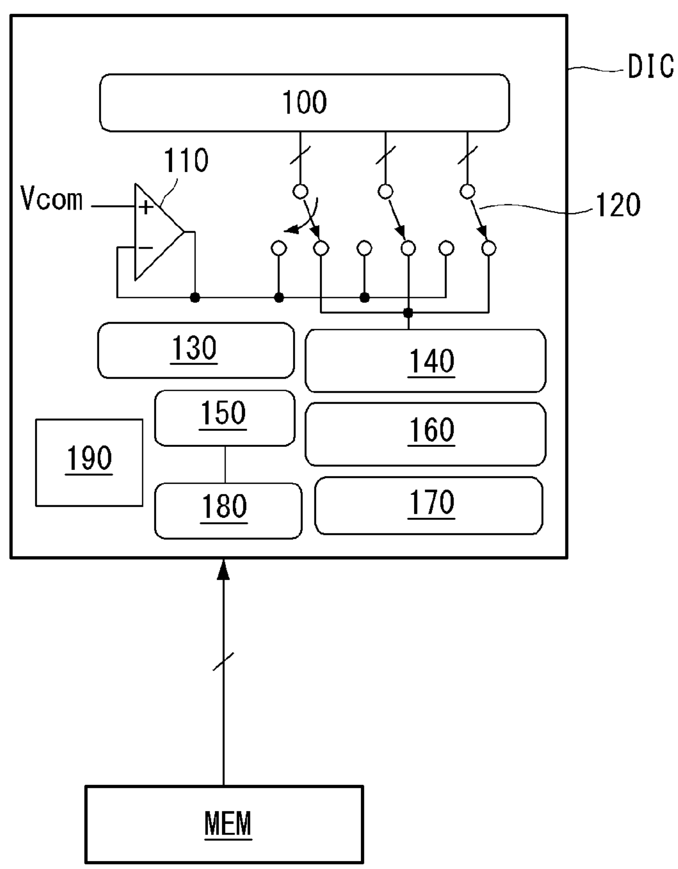
Figure 9:
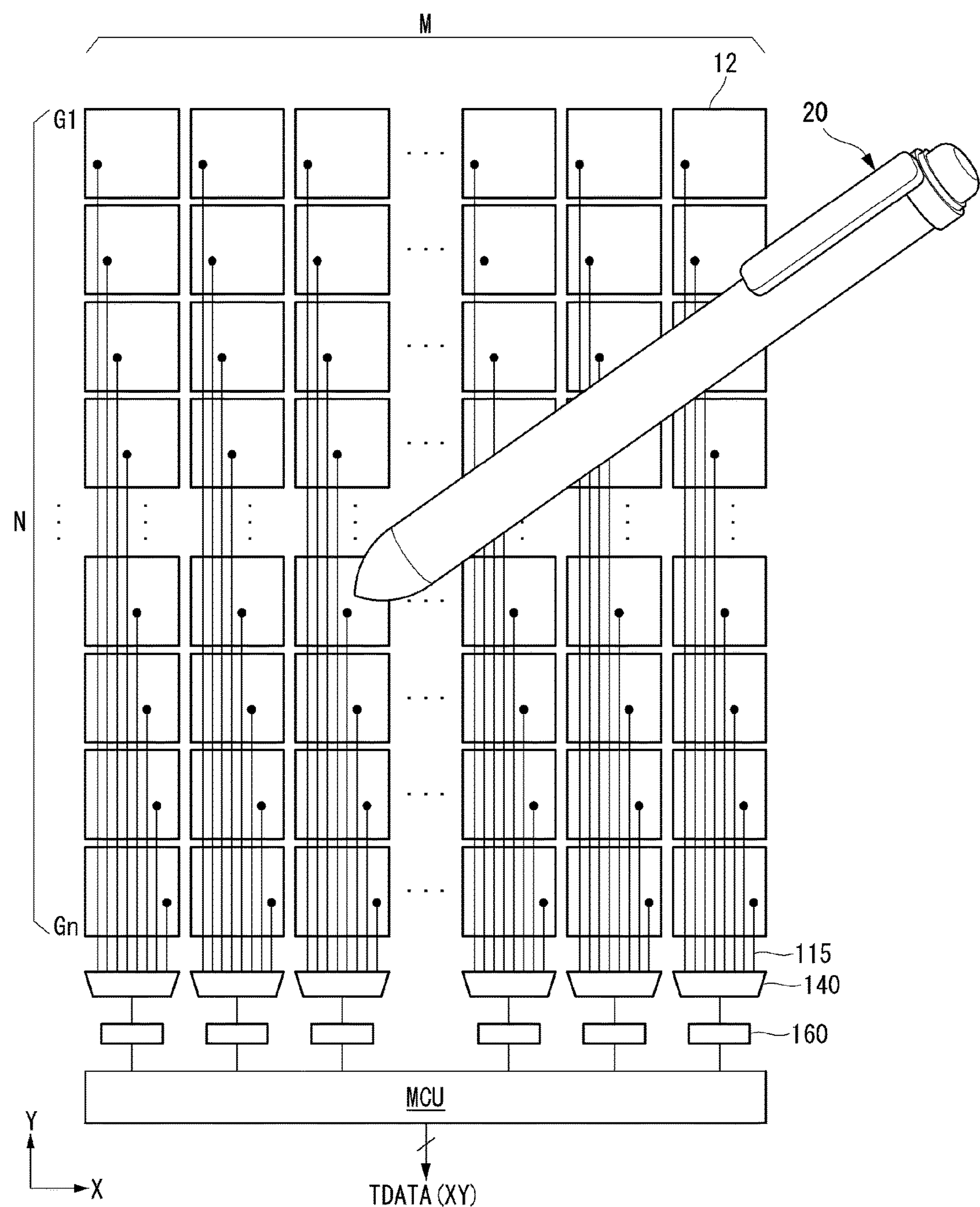
FIG. 9 illustrates multiplexers and sensing units connected to touch sensor blocks.

FIG. 2 illustrates a display device 10 applied to the touch sensing system according to an embodiment of the present invention. FIG. 3 illustrates an example of touch sensors included in a pixel array. FIG. 4 illustrates a method of time-division-driving pixels and touch sensors of a display panel as shown in FIG. 3. FIG. 5 illustrates an example in which a plurality of touch frames is included in one display frame period. FIGS. 6 to 8 illustrate touch drivers according to embodiments of the present invention. FIG. 9 illustrates multiplexers and sensing units connected to touch sensor blocks;

Referring to FIGS. 2 to 9, the display device 10 of the present invention may be implemented on the basis of a flat panel display such as a liquid crystal display (LCD), a field emission display (FED), a plasma display panel (PDP), an organic light emitting diode (OLED) display or an electrophoretic display (EPD). While the following description is based on the assumption that the display device is an LCD in the following embodiments, the display device of the present invention is not limited to an LCD.

The display device 10 includes a display module and a touch module

The touch module includes a touchscreen TSP and a touch driver 18.

The touchscreen TSP may be implemented as a capacitive touchscreen that senses touch input through a plurality of capacitance sensors. The touchscreen TSP includes a plurality of touch sensors having capacitance. Capacitance can be classified into self-capacitance and mutual capacitance. Self-capacitance can be generated along a single-layer conductive line formed in one direction, whereas mutual capacitance can be formed between two conductive lines intersecting each other.

The touch sensors of the touchscreen TSP may be embedded in a pixel array of a display panel DIS. An example in which the touchscreen TSP is embedded in the pixel array of the display panel DIS is shown in FIG. 3. Referring to FIG. 3, the pixel array of the display panel DIS touch sensors C1 to C4 and sensor lines L1 to Li (i being a positive integer less than m and n) connected to the touch sensors C1 to C4. A common electrode COM of pixels 101 is divided into a plurality of segments. The touch sensors C1 to C4 are implemented as divided common electrodes COM. A single common electrode segment is commonly connected to a plurality of pixels 101 to form a single touch sensor. Accordingly, the touch sensors C1 to C4 supply a common voltage Vcom to the pixels 101 for display periods Td1 and Td2 and receive a touchscreen driving signal Ts to sense touch input for touch periods Tt1 and Tt2. While FIG. 3 shows self-capacitance type touch sensors, the touch sensors C1 to C4 are not limited thereto.

The touch driver 18 applies the touchscreen driving signal Ts to the touch sensors C1 to C4 and senses charge variations of the touch sensors C1 to C4 to determine whether touch is applied through a conductive material such as a finger (or a stylus pen) and the touch point.

The touch driver 18 drives the touch sensors for the touch periods Tt1 and Tt2 in response to a touch enable signal TEN input from a timing controller 16 or a host system 19. The touch driver 18 supplies the touchscreen driving signal Ts to the touch sensors C1 to C4 through the sensor lines L1 to Li for the touch periods Tt1 and Tt2 to sense touch input. The touch driver 18 analyzes charge variations of the touch sensors depending on presence or absence of touch input to determine touch input and calculate coordinates of the touch input point. The coordinate information of the touch input point is transmitted to the host system.

The touch driver 18 drives the touch sensors C1 to C4 in response to the touch enable signal TEN for the touch periods Tt1 and Tt2. The touch driver 18 allocates at least two touch frames TF1, TF2 and TF3 for driving the touch sensors C1 to C4 within one display frame for displaying an input image, to thereby increase a touch report rate to higher than a display frame rate. Here, one touch frame can include a plurality of touch periods corresponding to the number of multiplexers.

For example, when one frame period is divided into a plurality of display periods Td1 and Td2 and touch periods Tt1 and Tt2, as shown in FIG. 4, the touch driver 18 senses touch input for each touch period Tt1 and Tt2 and transmits coordinate information of touch input to the host system at the end of each touch frame. Accordingly, the present invention can increase the touch report rate to higher than the display frame rate. The display frame rate is a frame frequency at which one frame image is written into the pixel array. The touch report rate is a rate at which coordinate information of touch input is generated. As the touch report rate increases, a touch input coordinate recognition rate increases, thus improving touch sensitivity.

The touch driver 18 of the present invention may be implemented as integrated circuit (IC) packages as illustrated in FIGS. 6, 7 and 8.

Referring to FIG. 6, the touch driver 18 includes a driver IC DIC and a touch IC TIC.

The driver IC DIC includes a touch sensor channel part 100, a Vcom buffer 110, a switch array 120, a timing control signal generator 130, a multiplexer (MUX) 140 and a DTX compensator 150.

The touch sensor channel part 100 is connected to electrodes of touch sensors through sensor lines and is connected to the Vcom buffer 110 and the multiplexer 140 through the switch array 120. The multiplexer 140 connects the sensor lines to the touch IC TIC. When the multiplexer 140 is a 1:3 multiplexer, the multiplexer 140 sequentially connects one channel of the touch IC TIC to three sensor lines according to a time division system to reduce the number of channels of the touch IC TIC. The multiplexer 140 sequentially selects the sensor lines to be connected to the channels of the touch IC TIC in response to MUX control signals MUX C1 to C3. The multiplexer 140 is connected to the channels of the touch IC TIC through touch lines. The switching array 120 supplies the common voltage Vcom from the Vcom buffer 110 to the touch sensor channel part 100 for a display period under the control of the timing control signal generator 130. The switch array 120 connects the sensor lines to the touch IC TIC for a touch period under the control of the timing control signal generator 130.

The timing control signal generator 130 generates timing control signals for controlling operation timing of display driving circuits and the touch IC (TIC).

The timing control signal generator 130 may be included in the timing controller 16 shown in FIG. 2. The timing control signal generator 130 drives the display driving circuits for a display period and drives the touch IC TIC for a touch period.

The timing control signal generator 130 generates a touch enable signal TEN defining display periods Td1 and Td2 and touch periods Tt1 and Tt2, as shown in FIG. 4, to synchronize the display driving circuits with the touch IC TIC. The display driving circuits write video data into pixels for a first level period of the touch enable signal TEN. The touch IC TIC drives the touch sensors in response to a second level of the touch enable signal TEN to sense touch input. The first level of the touch enable signal TEN may be a high level and the second level may be a low level and vice versa.

The touch IC TIC is connected to a driving power supply (not shown) to be provided with driving power. The touch IC TIC generates a touchscreen driving signal Ts in response to the second level of the touch enable signal TEN and applies the touchscreen driving signal Ts to the touch sensors. While the touchscreen driving signal Ts may have various forms such as a square pulse, sine wave and triangular wave, the touchscreen driving signal Ts preferably has a square wave form. The touchscreen driving signal Ts may be applied to each touch sensor N times such that charges can be accumulated in integrators of the touch IC TIC more than N times (N being a natural number greater than or equal to 2).

Noise in a touch sensor signal may increase as input video data varies. The DTX compensator 150 analyzes the input video data to remove a noise component from touch raw data in response to input image gradation change and transmits the input video data to the touch IC TIC. DTX refers to display and touch crosstalk. The DTX compensator 150 is described in detail in Korean Patent No. 10-2012-0149028 (filed 19, Dec., 2012) filed by the applicant. A system in which touch sensor noise does not sensitively vary according to input video data change does not require the DTX compensator 150 and thus the DTX compensator 150 can be omitted. In FIG. 6, DTX DATA denotes output data of the DTX compensator 150.

The touch IC TIC drives the multiplexer 140 for the touch periods Tt1 and Tt2 in response to the touch enable signal TEN from the timing control signal generator 130 to receive charges of the touch sensors through the multiplexer 140 and the sensor lines. In FIG. 6, MUX C1 to C3 denote signals of the multiplexer for selecting channels.

The touch IC TIC detects charge variations before and after touch input from touch sensor signals, compares the charge variations with a predetermined threshold value and determines positions of touch sensors having charge variations exceeding the threshold value as a touch input region. The touch IC TIC calculates coordinates for each touch input and transmits touch data TDATA(XY) including touch input coordinate information to the external host system 19. The touch IC TIC includes an amplifier for amplifying charges of a touch sensor, an integrator for accumulating charges received from the touch sensor, an analog-to-digital converter (ADC) for converting the voltage of the integrator into digital data, and an operation logic. The operation logic executes a touch recognition algorithm for comparing touch raw data output from the ADC with a threshold value, determining touch input on the basis of the comparison result and calculating coordinates.

The driver IC DIC and the touch IC TIC can transmit/receive signals through a serial peripheral interface (SPI).

The host system 19 refers to a system main body of an electronic device to which the display device 10 according to the present invention is applicable. The host system 19 may be any of a phone system, a TV system, a set-top box, a navigation system, a DVD player, a Blu-ray player, a personal computer (PC) and a home theater system. The host system 19 transmits data RGB of an input image to the driver IC DIC, receives touch input data TDATA(XY) from the touch IC TIC and executes an application related to touch input.

Referring to FIG. 7, the touch driver 18 includes a driver IC DIC and a micro-controller unit (MCU).

The driver IC DIC includes a touch sensor channel part 100, a Vcom buffer 110, a switch array 120, a first timing control signal genitor 130, a multiplexer 140, a DTX compensator 150, a sensing unit 160, a second timing control signal generator 170 and a memory 180. The present embodiment differs from the embodiment described with reference to FIG. 6 in that the sensing unit 160 and the second timing control signal generator 170 are integrated into the driver IC DIC. The first timing control signal generator 130 is substantially the same as that shown in FIG. 6. Accordingly, the first timing control signal generator 130 generates timing control signals for controlling operation timing of the display driving circuits and the touch IC TIC.

The multiplexer 140 floats touch sensor electrodes accessed by the sensing unit 160 under the control of the MCU. The sensing unit 160 accesses touch sensor electrodes other than touch sensor electrodes connected to pixels charging data voltages. The multiplexer 140 can supply the common voltage Vcom under the control of the MCU. When the touchscreen has a resolution of M×N (M and N being positive integers equal to or greater than 2) as shown in FIG. 9, M multiplexers 140 are required. The touch sensor electrodes 22 are divided into M×N electrodes when the resolution of the touchscreen is M×N. Each multiplexer 140 is connected to N touch sensor electrodes 22 through N sensor lines 115 and sequentially connects the N sensor lines 115 to a single sensing unit 160.

The sensing unit 160 is connected to the sensor lines 115 through the multiplexer 140, measures variations in voltage waveforms received from the touch sensor electrodes 22 and converts the voltage waveform variations into digital data. The sensing unit 160 includes amplifiers for amplifying received voltages of the touch sensor electrodes 22, integrators for integrating voltages of the amplifiers and analog-to-digital converters (referred to hereinafter as "ADCs") for converting voltages of the integrators into digital data. The digital data output from the ADCs is transmitted to the MCU as touch raw data. When the touchscreen has a resolution of M×N (M and N being positive integers equal to or greater than 2) as shown in FIG. 9, M sensing units 160 are required.

The second timing control signal generator 170 generates timing control signals, a clock signal and the like for controlling operation timing of the multiplexer 140 and the sensing unit 160. The DTX compensator 150 may be omitted in the driver IC DIC. The memory 180 temporarily stores the touch raw data TDATA under the control of the second timing control signal generator 170.

The driver IC DIC and the MCU can transmit and receive signals through a serial peripheral interface (SPI). The MCU executes a touch recognition algorithm for comparing touch raw data TDATA with a threshold value, determining touch input depending on the comparison result and calculating coordinates.

Referring to FIG. 8, the touch driver 18 includes a driver IC DIC and a memory MEM.

The driver IC DIC includes a touch sensor channel part 100, a Vcom buffer 110, a switch array 120, a first timing control signal genitor 130, a multiplexer 140, a DTX compensator 150, a sensing unit 160, a second timing control signal generator 170, a memory 180 and an MCU 190. The present embodiment differs from the embodiment described with reference to FIG. 6 in that the MCU 190 is integrated into the driver IC DIC. The MCU 180 executes a touch recognition algorithm for comparing touch raw data TDATA with a threshold value, determining touch input depending on the comparison result and calculating coordinates.

The memory MEM stores register set values with respect to timing information necessary for operations of the display driving circuits and the sensing unit 160. The register set values are loaded to the first timing control signal generator 160 and the second timing control signal generator 170 when the display device is powered on. The first timing control signal generator 160 and the second timing control signal generator 170 generate timing control signals for controlling the display driving circuits on the basis of the register set values read from the memory. The register set values of the memory MEM can be changed without a structural modification of the driver to cope with model change.

The display module may include the display panel DIS, display driving circuits 12, 14 and 16 and the host system 19.

The display panel DIS includes a liquid crystal layer formed between two substrates. The pixel array of the display panel DIS includes pixels formed at pixel regions defined by data lines D1 to Dm (m being a positive integer) and gate lines G1 to Gn (n being a positive integer). The pixels respectively include thin film transistors (TFT) formed at intersections of the data lines D1 to Dm and the gate lines G1 to Gn, pixel electrodes charging data voltages and storage capacitors Cst connected to the pixel electrodes to maintain voltages of liquid crystal cells.

The upper substrate of the display panel DIS may include a black matrix, a color filter and the like formed thereon. The lower substrate of the display panel DIS may be implemented in a color filter on TFT (COT) structure. In this case, the black matrix and the color filter can be formed on the lower substrate of the display panel DIS. Common electrodes to which the common voltage is supplied can be formed on the upper substrate or the lower substrate of the display panel DIS. A polarizer is attached to the upper substrate and the lower substrate of the display panel DIS and an alignment film for setting a pretilt angle of liquid crystal is formed on the inner sides of the upper substrate and the lower substrate which come into contact with the liquid crystal. Column spacers for maintaining a cell gap of liquid crystal cells are formed between the upper substrate and the lower substrate of the display panel DIS.

A backlight unit may be provided below the rear side of the display panel DIS. The backlight unit is implemented as an edge type or direct type backlight unit to emit light to the display panel DIS. The display panel DIS can be realized in any liquid crystal mode such as a twisted nematic (TN) mode, a vertical alignment (VA) mode, an in plane switching (IPS) mode or a fringe field switching (FFS) mode.

The display driving circuits include a data driving circuit 12, a gate driving circuit 14 and a timing controller 15 and write video data of an input image to pixels of the display panel DIS. The data driving circuit 12 converts digital video data RGB input from the timing controller 16 into analog positive/negative gamma compensation voltages and outputs the analog positive/negative gamma compensation voltages. Data voltages output from the data driving circuit 12 are supplied to the data lines D1 to Dm. The gate driving circuit 14 sequentially provides gate pulses (or scan pulses) synchronized with data voltages to the gate lines G1 to Gn to select pixel lines of the display panel DIS to which the data voltages are written. The gate driving circuit 14 may be arranged on the substrate of the display panel DIS on which the pixels are formed.

The timing controller 16 receives timing signals such as a vertical synchronization signal Vsync, a horizontal synchronization signal Hsync, a data enable signal DE and a main clock signal MCLK input from the host system 19 and synchronizes operation timing of the data driving circuit 12 with operation timing of the gate driving circuit 14. Scan timing control signals include a gate start pulse (GSP) signal, a gate shift clock signal, a gate output enable (GOE) signal, etc. Data timing control signals include a source sampling clock (SSC) signal, a polarity control signal (POL), a source output enable (SOE) signal, etc.

The host system 19 can transmit the timing signals Vsync, Hsync, DE and MCLK along with the digital video data RGB to the timing controller 16 and can execute an application program related to touch coordinate information XY input from the touch driver 18.

Meanwhile, the touch enable signal TEN shown in FIG. 4 may be generated in the host system 19. The data driving circuit 12 provides data voltages to the data lines D1 to Dm under the control of the timing controller 16 for the display periods Td1 and Td2 and the gate driving circuit 14 sequentially provides gate pulses synchronized with the data voltages to the gate lines G1 to Gn under the control of the timing controller 16. The touch driver 18 stops the operation for the display periods Td1 and Td2.

The touch driver 18 applies the touchscreen driving signal Ts to the touch sensors of the touchscreen TSP for the touch periods Tt1 and Tt2. For the touch periods Tt1 and Tt2, the display driving circuits 12, 14 and 16 may provide an AC signal having the same magnitude and phase as those of the touchscreen driving signal Ts to the signal lines D1 to Dm and G1 to Gn in order to minimize parasitic capacitance between the touch sensors and the signal lines D1 to Dm and G1 to Gn connected to the pixels. In this case, display noise included in a touch sensing signal can be remarkably reduced, improving touch sensing accuracy.

[Stylus Pen]

Figure 10:
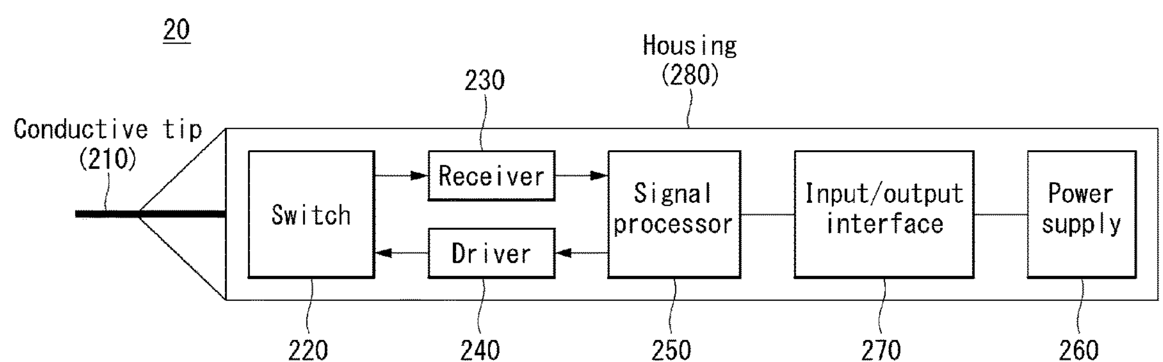
FIG. 10 illustrates an internal configuration of an active stylus pen according to the present invention.

FIG. 10 illustrates an internal configuration of the active stylus pen 20 according to the present invention.

Referring to FIG. 10, the active stylus pen 20 includes a housing 280, a conductive tip 210 projected from one side of the housing 280, a switch 220 connected to the conductive tip 210 inside of the housing 280, a receiver 230 for receiving a touchscreen driving signal input from the conductive tip 210 through the switching unit 220, a signal processor 250 for generating a digital pen driving signal in which additional pen information has been reflected on the basis of the touchscreen driving signal from the receiver 230, a driver 240 for shifting the digital pen driving signal generated by the signal processor 250 to an analog level and then providing the level-shifted signal to the conductive tip 210 through the switch 220, a power supply 260 for generating driving power necessary for operation, and an input/output interface 270.

The conductive tip 210 is formed of a conductive material such as a metal and serves as a reception electrode and a transmission electrode. When the conductive tip 210 contacts the touchscreen TSP of the display device 10, the conductive tip 210 couples with the touchscreen TSP at the contact point. The conductive tip 210 receives the touchscreen driving signal from the touchscreen TSP at the contact point and then transmits a pen driving signal generated in the active stylus pen 20 to be synchronized with the touchscreen driving signal to the contact point of the touchscreen TSP.

The switch 220 electrically connects the conductive tip 210 and the receiver 230 for a time Rx and then electrically connects the conductive tip 210 and the driver 240 for a time Tx to separate touchscreen driving signal reception timing from pen driving signal transmission timing when the conductive tip 210 contacts the touchscreen TSP of the display device 10. Since the conductive tip 210 serves as the reception electrode and the transmission electrode, the structure of the active stylus pen 20 is simplified.

The receiver 230 may include at least one amplifier to amplify the touchscreen driving signal input from the conductive tip 210 through the switch 220. The receiver 230 includes a comparator for comparing the amplified signal with a predetermined reference voltage and outputs the comparison result to the signal processor 250.

The signal processor 250 discriminates touch frames on the basis of the touchscreen driving signal input from the receiver 230, varies the pen driving signal in units of a touch frame and reflects the additional pen information in the pen driving signal. To this end, the signal processor 250 includes a first signal processor for discriminating touch frames and a second signal processor for reflecting the additional pen information in the pen driving signal.

The first signal processor may generate a touch frame recognition signal on the basis of sub-pulses corresponding to part of each touchscreen driving signal received from the touchscreen. The second signal processor may generate the pen driving signal synchronized with main pulses of each touchscreen driving signal other than the sub-pulses and vary the pen driving signal in units of a touch frame according to the touch frame recognition signal such that the additional pen information is reflected in the pen driving signal.

The signal processor 250 outputs the pen driving signal in which the additional pen information has been reflected to the driver.

The driver 240 includes a level shifter to shift the pen driving signal at a digital level to an analog level pen driving signal. The driver 240 outputs the level-shifted pen driving signal to the conductive tip 210 through the switch 220.

The input/output interface 270 can be connected to the power supply 260 to supply power necessary for the receiver 230, the driver 240 and the signal processor 250.

Figure 11:
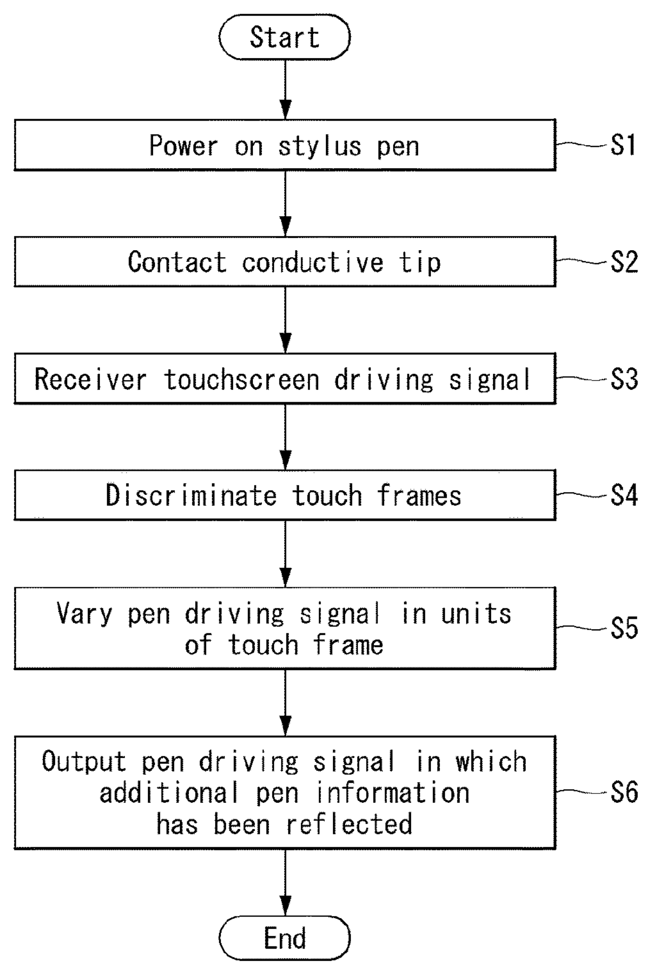
FIG. 11 is a flowchart illustrating an operation of reflecting additional pen information in a pen driving signal in the active stylus pen according to the present invention.

FIG. 11 is a flowchart illustrating an operation procedure for reflecting the additional pen information in the pen driving signal in the active stylus pen 20 according to the present invention.

Referring to FIG. 11, the conductive tip 210 contacts a predetermined point of the touchscreen TSP while power is supplied through the input/output interface 270 and the power supply 260 (S1 and S2).

The touch sensors of the touchscreen TSP are provided with a touchscreen driving signal for a touch period. The conductive tip 210 couples with the touchscreen TSP at the contact point to sense the touchscreen driving signal received from the touchscreen TSP and deliver the sensed signal to the receiver 230 for the touch period. The receiver 230 amplifies the touchscreen driving signal through internal amplifiers, compares the amplified signal with a reference voltage through internal comparators and outputs the comparison result to the signal processor 250 (S3).

The signal processor 250 analyzes the touchscreen driving signal input from the receiver 230 to determine timing synchronized with the touchscreen driving signal, and then generates the pen driving signal at the synchronization timing. Particularly, the signal processor 250 generates the touch frame recognition signal on the basis of the touchscreen driving signal to discriminate touch frames and varies the pulse amplitude and/or the pulse duty of the pen driving signal in units of a touch frame such that the pulse amplitude and/or the pulse duty of the pen driving signal correspond to predetermined additional pen information to thereby output the pen driving signal in which the additional pen information has been reflected (S4, S5 and S6).

Figure 12A:
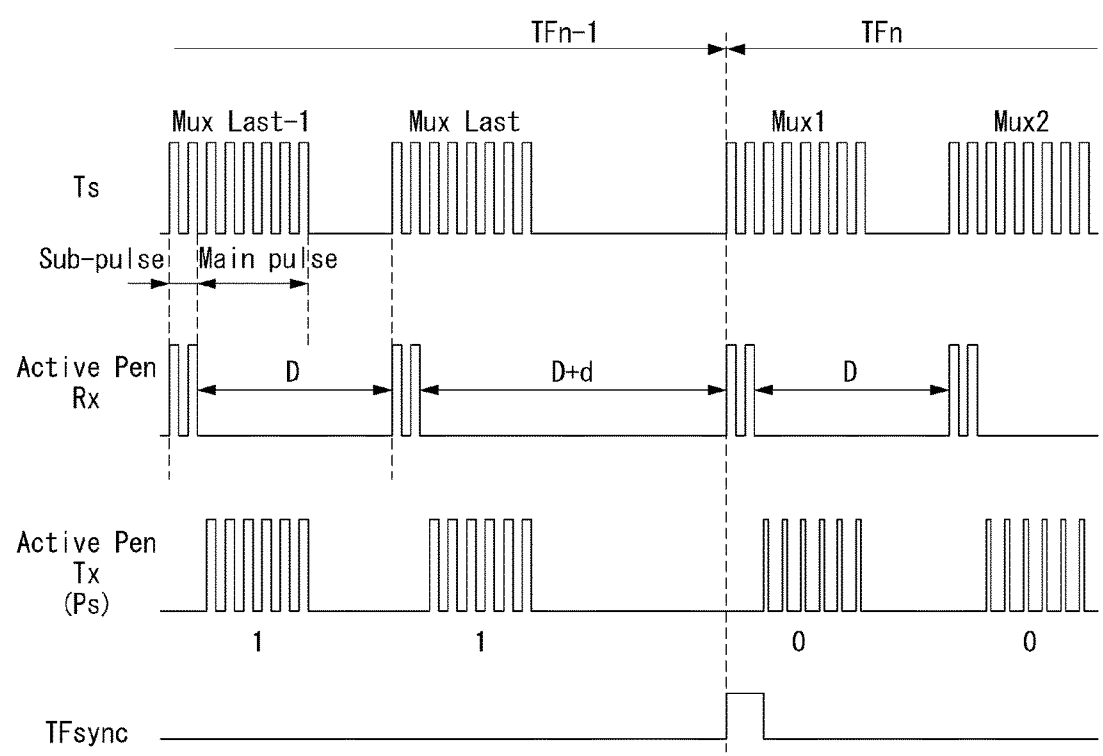
Figure 12B:
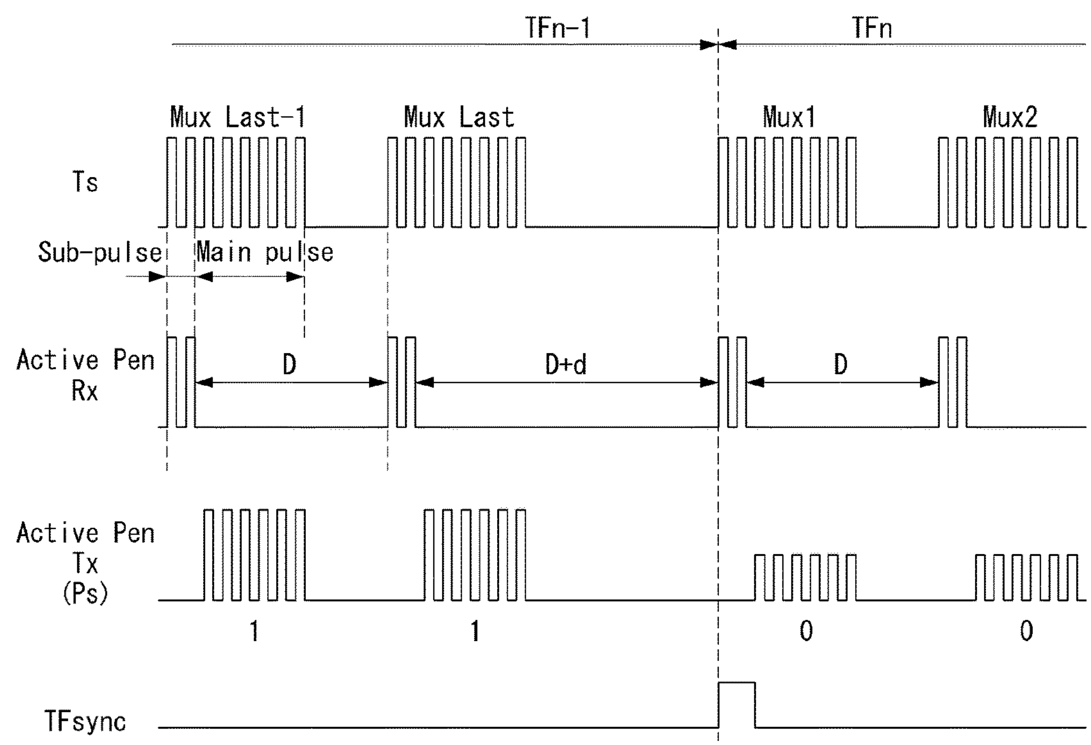
Figure 13A:
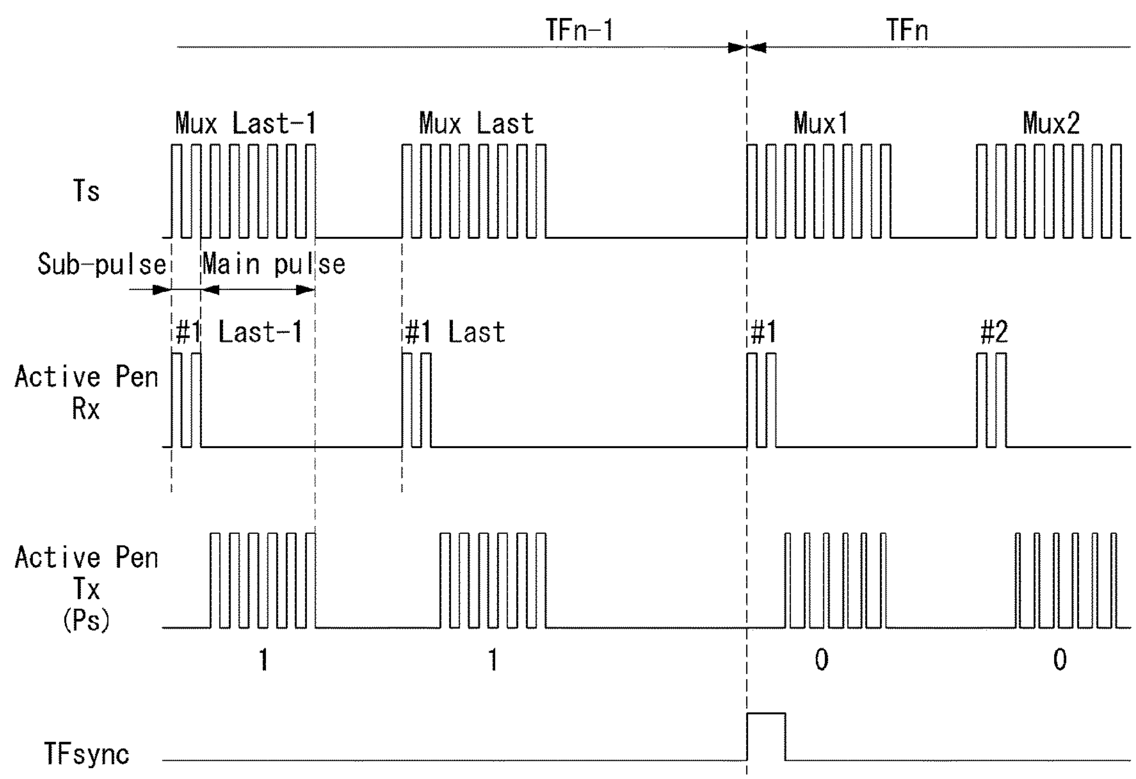
Figure 13B:
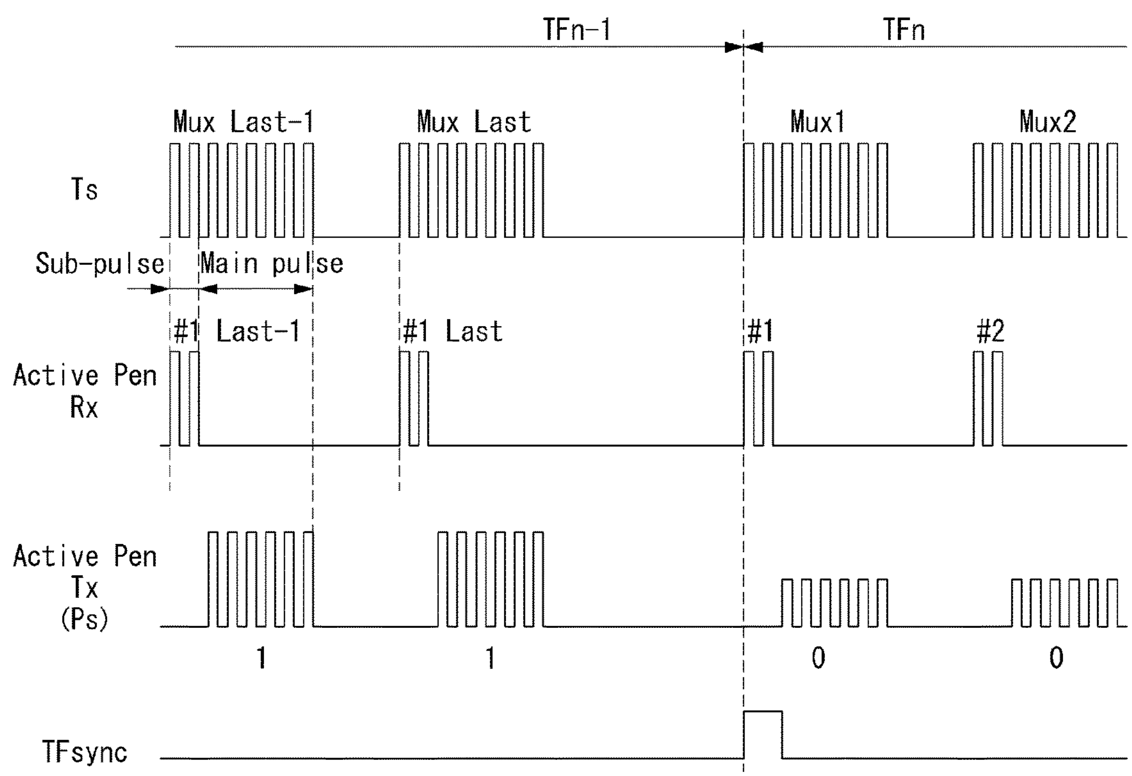

FIGS. 12*a* and 12*b* illustrate a method of discriminating touch frames through the active stylus pen and various modulation forms of a pen driving signal for representing additional pen information. FIGS. 13*a* and 13*b* illustrate another method of discriminating touch frames through the active stylus pen and various modulation forms of a pen driving signal for representing additional pen information. FIG. 14 illustrates a method of generating additional pen information using a plurality of touch frames in the active stylus pen. FIG. 15 illustrates a variation of touch row data sensed by the touch driver according to additional pen information.

Referring to FIGS. 12*a* and 12*b*, the first signal processor of the active stylus pen 20 may count an interval between a first sub-pulse of a touchscreen driving signal Ts and a second sub-pulse of a neighboring touchscreen driving signal Ts to generate a first count value and generate a touch frame recognition signal TFsync for discriminating touch frames when the first count value exceeds a predetermined threshold value. In FIGS. 12*a* and 12*b*, Mux 1 to Mux last denote touchscreen driving signals corresponding to one touch period Tt1 or Tt2 shown in FIG. 4.

The touchscreen driving signal Ts includes sub-pixels allocated to part of one touch period and main pulses allocated to the remaining part of the one touch period. The sub-pulses of the touchscreen driving signal Ts can be used to determine validity of the touchscreen driving signal Ts. The first signal processor of the active stylus pen 20 can generate the touch frame recognition signal TFsync on the basis of the sub-pulses of the touchscreen driving signal Ts.

For example, the first signal processor generates the first count value corresponding to the interval D or D+d between neighboring touchscreen driving signals Mux 1 and Mux 2, Mux 2 and Mux 3, . . . , Mux Last-1 and Mux Last or Mux Last and Mux 1 and generates the touch frame recognition signal TFsync when the first count value exceeds the predetermined threshold value. When a vertical blank period d is included between touch frames TFn-1 and TFn), the interval D+d between neighboring touchscreen driving signals Mux Last and Mux 1 within different touch frames can be longer than the interval D between neighboring touchscreen driving signals Mux Last-1 and Mux Last within the same touch frame by the vertical blank period d. In this case, the first signal processor can determine that the touchscreen driving signal Mux following the touchscreen driving signal Mux Last belongs to a new touch frame and generate the touch frame recognition signal TFsync in synchronization with the touchscreen driving signal Mux 1 of the new touch frame.

Referring to FIGS. 12*a* and 12*b*, the second signal processor of the active stylus pen 20 generates a pen driving signal Ps synchronized with main pulses of each touchscreen driving signal Ts other than sub-pulses. Here, the second signal processor of the active stylus pen 20 can vary the pulse duty of the pen driving signal Ps in units of a touch frame TFn-1 or TFn according to the touch frame recognition signal TFsync such that predetermined additional pen information is reflected in the pen driving signal Ps, as shown in FIG. 12*a*, or vary the pulse amplitude of the pen driving signal Ps in units of a touch frame TFn-1 or TFn according to the touch frame recognition signal TFsync such that the predetermined additional pen information is reflected in the pen driving signal Ps, as shown in FIG. 12*b*. Although not shown in the figures, the second signal processor of the active stylus pen 20 may vary the pulse duty and pulse amplitude of the pen driving signal Ps in units of a touch frame TFn-1 or TFn according to the touch frame recognition signal TFsync such that the predetermined additional pen information is reflected in the pen driving signal Ps.

Referring to FIGS. 13*a* and 13*b*, the first signal processor of the active stylus pen 20 may generate a second count value by counting sub-pulses included in each touchscreen driving signal Ts and generate the touch frame recognition signal TFsync for discriminating touch frames when the second count value satisfies a predetermined value. In FIGS. 13*a* and 13*b*, Mux 1 to Mux last denote touchscreen driving signals corresponding to one touch period Tt1 or Tt2 shown in FIG. 4. For example, the first signal processor can generate the touch frame recognition signal TFsync for discriminating touch frames when the second count value corresponding to the number #1 or #Last of sub-pulses included in each touchscreen driving signal Ts satisfies the predetermined value.

Referring to FIGS. 13*a* and 13*b*, the second signal processor of the active stylus pen 20 generates the pen driving signal Ps synchronized with main pulses of each touchscreen driving signal Ts other than sub-pulses. Here, the second signal processor of the active stylus pen 20 can vary the pulse duty of the pen driving signal Ps in units of a touch frame TFn-1 or TFn according to the touch frame recognition signal TFsync such that the predetermined additional pen information is reflected in the pen driving signal Ps, as shown in FIG. 13*a*, or vary the pulse amplitude of the pen driving signal Ps in units of a touch frame TFn-1 or TFn according to the touch frame recognition signal TFsync such that the predetermined additional pen information is reflected in the pen driving signal Ps, as shown in FIG. 13*b*. Although not shown in the figures, the second signal processor of the active stylus pen 20 may vary the pulse duty and pulse amplitude of the pen driving signal Ps in units of a touch frame TFn-1 or TFn according to the touch frame recognition signal TFsync such that the predetermined additional pen information is reflected in the pen driving signal Ps.

Meanwhile, variation in the pen driving signal Ps may not disturb touch input detection. Accordingly, a range in which the second signal processor can vary the pulse amplitude and/or the pulse duty of the pen driving signal Ps to represent additional pen information needs to be within a range in which touch input detection according to the pen driving signal Ps can be performed.

The second signal processor can represent the pen driving signal Ps corresponding to each touch frame as "0" or "1" by generating the pen driving signal Ps in which the additional pen information has been reflected through the methods illustrated in FIGS. 12*a* to 13*b*. That is, the second signal processor can generate the pen driving signal Ps having a first pulse amplitude and/or a first pulse duty to represent the pen driving signal Ps as "1" and generate the pen driving signal Ps having a second pulse amplitude (less than the first pulse amplitude) and/or a second pulse duty (less than the first pulse duty) to represent the pen driving signal Ps as "0".

The second signal processor can accurately represent information by allocating the 1-bit pen driving signal Ps in which the additional pen information has been reflected to one touch frame. For example, the second signal processor can represent 256 gray-scales by allocating the 1-bit pen driving signal Ps to each of 8 touch frames TF1 to TF8, as illustrated in FIG. 14.

As illustrated in FIG. 15, a touch sensing value according to the pen driving signal Ps represented by a logic value "1" is greater than a touch sensing value according to the pen driving signal Ps represented by a logic value "0". The touch driver 18 of the display device 10 can sense additional pen information of multiple bits on the basis of the magnitude of a touch sensing value according to the pen driving signal Ps.

FIGS. 16 and 17 illustrate a method for improving accuracy of synchronization between an active stylus pen and a touchscreen and FIG. 18 illustrates an example of bit allocation according to synchronization signal patterns.

The active stylus pen operates through a signal synchronized with the touchscreen. Accordingly, there is a need for a method of correctly synchronizing the active stylus pen with the touchscreen even in an environment having various types of noise. In addition, it is necessary to realize a function of changing the operating frequency of the active stylus pen to avoid performance deterioration due to a noise and other additional functions.

Referring to FIGS. 16 and 17, the touchscreen driving signal Ts of the present invention further includes a beacon signal containing a pen operation mode, information indicating hovering or contact, information indicating whether tilt data is transmitted and the like. The beacon signal corresponds to a dummy touch period (TP). The active stylus pen can generate the touch frame recognition signal TFsync on the basis of the beacon signal and discriminate touch frames according to the touch frame recognition signal.

Sub-pulses of the touchscreen driving signal Ts and the beacon signal correspond to a synchronization signal for synchronization between main pulses of the touchscreen driving signal Ts and the pen driving signal Ps. The touch driver drives the beacon signal in the dummy touch period and drives a patterned ping signal in each touch period TP period such that correct synchronization can be achieved even when noise is present. The synchronization signal can be implemented as a patterned direct sequence spread spectrum (DSSS) code to maximize noise resistance. When the synchronization signal is configured as a DSSS code, the frequency bandwidth of a transmitted signal can be spread and thus a signal-to-noise ratio (SNR) is improved. That is, the synchronization signal configured as a DSSS code can be driven even in a noisy environment, improving accuracy of synchronization between the active stylus pen and the touchscreen.

The touch driver can transmit a command from the touchscreen to the active stylus pen and allocate a plurality of bits to the synchronization signal depending on the pattern of the synchronization signal to deliver various additional functions. That is, the touch driver can drive the bit-allocated beacon signal, as shown in FIG. 18, in the dummy touch period to deliver various additional functions, such as changing the driving frequency of the pen and changing operation parameters, to the pen. In addition, the touch driver can drive a bit-allocated ping signal, as shown in FIG. 18, in each touch period TP to increase accuracy of synchronization between the active stylus pen and the touchscreen.

As described above, the present invention can effectively reflect additional pen information in the pen driving signal by generating the touch frame recognition signal on the basis of sub-pulses corresponding to part of each touchscreen driving signal received from the touchscreen and adjusting the pulse amplitude and/or the pulse duty of the pen driving signal in units of a touch frame in response to the touch frame recognition signal according to predetermined additional pen information. The present invention can detect additional pen information reflected in the pen driving signal by sensing a touch raw data variation according to the pen driving signal.

Furthermore, the present invention can improve accuracy of synchronization between the active stylus pen and the touchscreen using a patterned synchronization signal. In addition, the present invention can transmit commands from the touchscreen to the pen using a bit-allocated synchronization signal to realize various additional functions.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. An active stylus pen, comprising:

a first signal processor configured to generate a touch frame recognition signal for discriminating touch frames on the basis of sub-pulses corresponding to part of each touchscreen driving signal received from a touchscreen; and a second signal processor configured to generate a pen driving signal having pulses each synchronized to be simultaneous with respective pulses of main pulses of each touchscreen driving signal other than the sub-pulses and to vary the pen driving signal in units of a touch frame according to the touch frame recognition signal such that additional pen information is reflected in the pen driving signal, wherein the touchscreen driving signal further includes a beacon signal containing a pen operation mode, information indicating hovering or contact and information indicating whether tilt data is transmitted, and wherein the sub-pulses and the beacon signal is realized as a patterned ping signal as a synchronization signal for synchronization between the main pulses and the pen driving signal.

2. The active stylus pen according to claim 1, wherein the first signal processor counts an interval between a first sub-pulse of a touchscreen driving signal and a second sub-pulse of another touchscreen driving signal neighboring the touchscreen driving signal to generate a first count value and generates the touch frame recognition signal when the first count value exceeds a predetermined threshold value.

3. The active stylus pen according to claim 1, wherein the first signal processor counts the sub-pulses included in each touchscreen driving signal to generate a second count value and generates the touch frame recognition signal when the second count value satisfies a predetermined value.

4. The active stylus pen according to claim 1, wherein the second signal processor varies a pulse amplitude of the pen driving signal in units of a touch frame according to the touch frame recognition signal such that the additional pen information is reflected in the pen driving signal.

5. The active stylus pen according to claim 1, wherein the second signal processor varies a pulse duty of the pen driving signal in units of a touch frame according to the touch frame recognition signal such that the additional pen information is reflected in the pen driving signal.

6. The active stylus pen according to claim 1, wherein the second signal processor allocates 1 bit of the pen driving signal in which the additional pen information has been reflected per touch frame.

7. The active stylus pen according to one of claim 1, wherein the additional pen information includes pen pressure information indicating pressure when the active stylus pen touches the touchscreen, button state information indicating whether at least one function button included in the active stylus pen and executing a specific function is activated, and pen identification information for discriminating the active stylus pen from other active stylus pens.

8. The active stylus pen according to claim 1, wherein the synchronization signal is configured as a direct sequence spread spectrum (DSSS) code.

9. The active stylus pen according to claim 1, wherein a plurality of bits are allocated to the synchronization signal depending on a pattern of the synchronization signal such that a command is transmitted from the touchscreen to the active stylus pen to secure various additional functions.

10. A touch sensing system, comprising:

a touchscreen;

a touch driver configured to apply a touchscreen driving signal to the touchscreen and to sense a capacitance variation in the touchscreen; and an active stylus pen configured to generate a pen driving signal and to transmit the pen driving signal to the touchscreen, wherein the active stylus pen comprises:

a first signal processor configured to generate a touch frame recognition signal for discriminating touch frames on the basis of sub-pulses corresponding to part of each touchscreen driving signal received from the touchscreen; and a second signal processor configured to generate the pen driving signal having pulses each synchronized to be simultaneous with respective pulses of main pulses of each touchscreen driving signal other than the sub-pulses and to vary the pen driving signal in units of a touch frame according to the touch frame recognition signal such that additional pen information is reflected in the pen driving, wherein the touchscreen driving signal further includes a beacon signal containing a pen operation mode, information indicating hovering or contact and information indicating whether tilt data is transmitted, and wherein the sub-pulses and the beacon signal is realized as a patterned ping signal as a synchronization signal for synchronization between the main pulses and the pen driving signal.

11. The touch sensing system according to claim 10, wherein the first signal processor counts an interval between a first sub-pulse of a touchscreen driving signal and a second sub-pulse of another touchscreen driving signal neighboring the touchscreen driving signal to generate a first count value and generates the touch frame recognition signal when the first count value exceeds a predetermined threshold value.

12. The touch sensing system according to claim 10, wherein the first signal processor counts the sub-pulses included in each touchscreen driving signal to generate a second count value and generates the touch frame recognition signal when the second count value satisfies a predetermined value.

13. The touch sensing system according to claim 10, wherein the second signal processor varies a pulse amplitude of the pen driving signal in units of a touch frame according to the touch frame recognition signal such that the additional pen information is reflected in the pen driving signal.

14. The touch sensing system according to claim 10, wherein the second signal processor varies a pulse duty of the pen driving signal in units of a touch frame according to the touch frame recognition signal such that the additional pen information is reflected in the pen driving signal.

15. The touch sensing system according to claim 10, wherein the second signal processor allocates 1 bit of the pen driving signal in which the additional pen information has been reflected per touch frame.

16. The touch sensing system according to one of claim 10, wherein the additional pen information includes pen pressure information indicating pressure when the active stylus pen touches the touchscreen, button state information indicating whether at least one function button included in the active stylus pen and executing a specific function is activated, and pen identification information for discriminating the active stylus pen from other active stylus pens.

17. The touch sensing system according to claim 10, wherein the synchronization signal is configured as a DSSS code.

18. The touch sensing system according to claim 10, wherein a plurality of bits are allocated to the synchronization signal depending on a pattern of the synchronization signal such that a command is transmitted from the touchscreen to the active stylus pen to secure various additional functions.

19. A method of driving a touch sensing system, comprising:

bringing an active stylus pen into contact with a touchscreen to receive a touchscreen driving signal by the active stylus pen;

the active stylus pen generating a pen driving signal synchronized with the received touchscreen driving signal and outputting the pen driving signal to the touchscreen; and a touch driver connected to the touchscreen sensing a capacitance variation in the touchscreen according to the touchscreen driving signal and the pen driving signal, wherein the active stylus pen generating the pen driving signal and outputting the pen driving signal to the touchscreen comprises:

generating a touch frame recognition signal for discriminating touch frames on the basis of sub-pulses corresponding to part of each touchscreen driving signal received from the touchscreen; and generating the pen driving signal having pulses each synchronized to be simultaneous with respective pulses of main pulses of each touchscreen driving signal other than the sub-pulses and varying the pen driving signal in units of a touch frame according to the touch frame recognition signal such that additional pen information is reflected in the pen driving signal, wherein the touchscreen driving signal further includes a beacon signal containing a pen operation mode, information indicating hovering or contact and information indicating whether tilt data is transmitted, and wherein the sub-pulses and the beacon signal is realized as a patterned ping signal as a synchronization signal for synchronization between the main pulses and the pen driving signal.

20. The method according to claim 19, wherein the generating of the touch frame recognition signal on the basis of the sub-pulses comprises counting an interval between a first sub-pulse of a touchscreen driving signal and a second sub-pulse of another touchscreen driving signal neighboring the touchscreen driving signal to generate a first count value and generating the touch frame recognition signal when the first count value exceeds a predetermined threshold value.

21. The method according to claim 19, wherein the generating of the touch frame recognition signal on the basis of the sub-pulses comprises counting sub-pulses included in each touchscreen driving signal to generate a second count value and generating the touch frame recognition signal when the second count value satisfies a predetermined value.

22. The method according to claim 19, wherein the varying of the pen driving signal in units of a touch frame according to the touch frame recognition signal such that additional pen information is reflected in the pen driving signal comprises varying a pulse amplitude of the pen driving signal in units of a touch frame according to the touch frame recognition signal.

23. The method according to claim 19, wherein the varying of the pen driving signal in units of a touch frame according to the touch frame recognition signal such that additional pen information is reflected in the pen driving signal comprises varying a pulse duty of the pen driving signal in units of a touch frame according to the touch frame recognition signal.

24. The method according to claim 19, wherein the varying of the pen driving signal in units of a touch frame according to the touch frame recognition signal such that additional pen information is reflected in the pen driving signal comprises allocating 1bit of the pen driving signal in which the additional pen information has been reflected per touch frame.

25. The method according to one of claim 19, wherein the additional pen information includes pen pressure information indicating pressure when the active stylus pen touches the touchscreen, button state information indicating whether at least one function button included in the active stylus pen and executing a specific function is activated, and pen identification information for discriminating the active stylus pen from other active stylus pens.

26. The method according to claim 19, wherein the synchronization signal is configured as a DSSS code.

27. The method according to claim 19, wherein a plurality of bits are allocated to the synchronization signal depending on a pattern of the synchronization signal such that a command is transmitted from the touchscreen to the active stylus pen to secure various additional functions.

* * * * *